H. E. BEASLEY & W. BYRD.
DIRIGIBLE HEADLIGHT FOR LOCOMOTIVES.
APPLICATION FILED FEB. 23, 1916.

1,204,930.

Patented Nov. 14, 1916.
2 SHEETS—SHEET 2.

WITNESSES
George L. Blume
C. Bradway

INVENTORS
H. E. Beasley
W. Byrd
BY
ATTORNEYS

UNITED STATES PATENT OFFICE.

HARRY E. BEASLEY AND WALTER BYRD, OF VICTORIA, BRITISH COLUMBIA, CANADA.

DIRIGIBLE HEADLIGHT FOR LOCOMOTIVES.

1,204,930.　　　　Specification of Letters Patent.　　Patented Nov. 14, 1916.

Application filed February 23, 1916.　Serial No. 79,937.

*To all whom it may concern:*

Be it known that we, HARRY E. BEASLEY and WALTER BYRD, subjects of the King of Great Britain, and residents of Victoria, in the Province of British Columbia and Dominion of Canada, have invented a new and Improved Dirigible Headlight for Locomotives, of which the following is a full, clear, and exact description.

This invention relates to headlights for locomotives and relates more particularly to means for automatically focusing the headlight upon the track at all times, whereby curves as well as straight portions of the track will be effectively illuminated.

The invention has for its general objects to improve and simplify the construction and operation of automatically adjustable focusing devices for locomotive headlights so as to be reliable and efficient in use, comparatively simple and inexpensive to manufacture and install, and so designed as to require no attention on the part of the engineer.

A more specific object of the invention is the provision of a durable headlight mounted to swing on a vertical pivot and having improved means for swinging the headlight to the right or left according to the curvature of the track, such means being set into operation by a controller which is located on the front truck and is actuated by the relative movement between the truck and the locomotive frame, the motive means for operating the headlight being steam, air, liquid or electric current.

With such objects in view, and others which will appear as the description proceeds, the invention comprises various novel features of construction and arrangement of parts which will be set forth with particularity in the following description and claims appended hereto.

Figure 1:
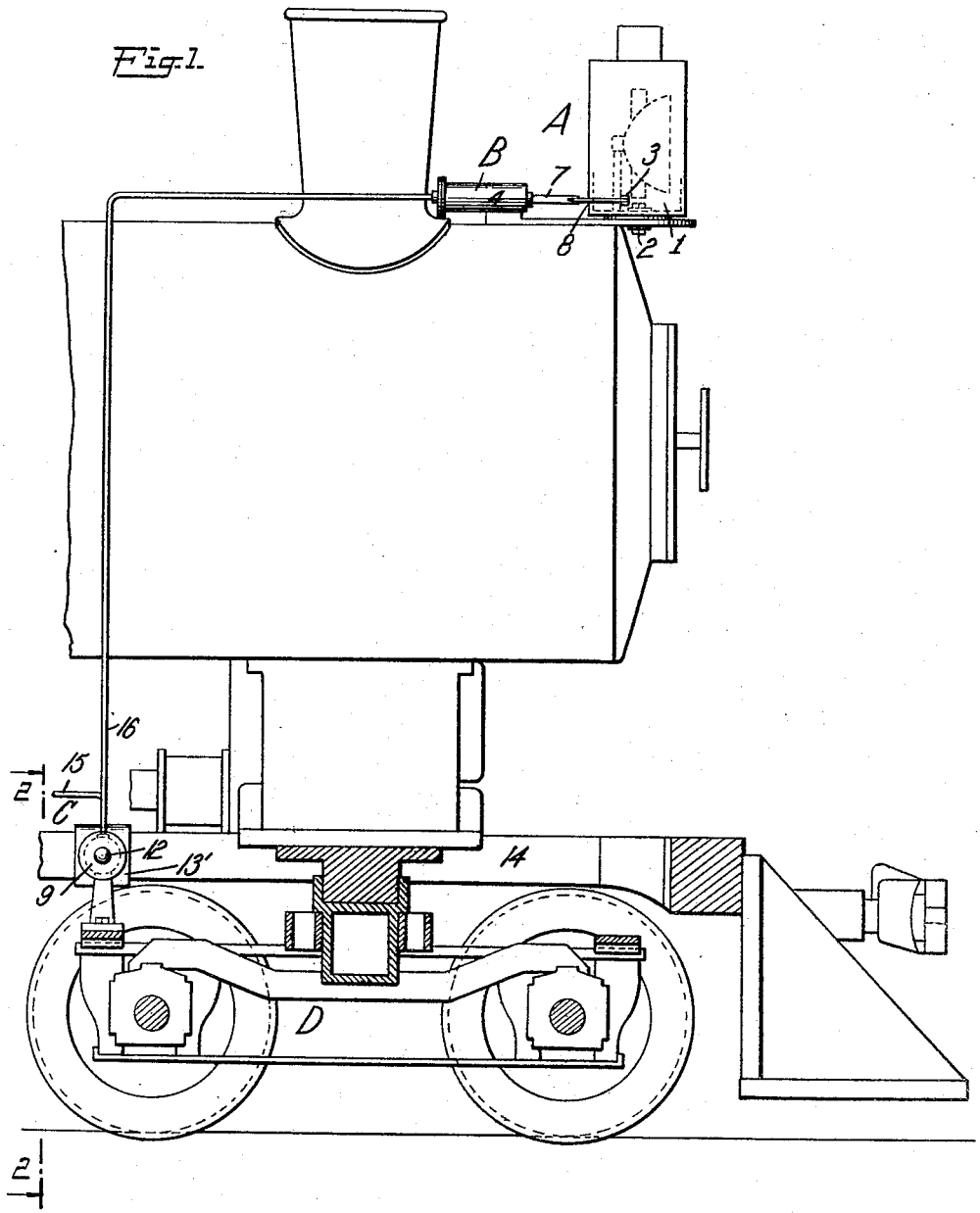
Figure 2:
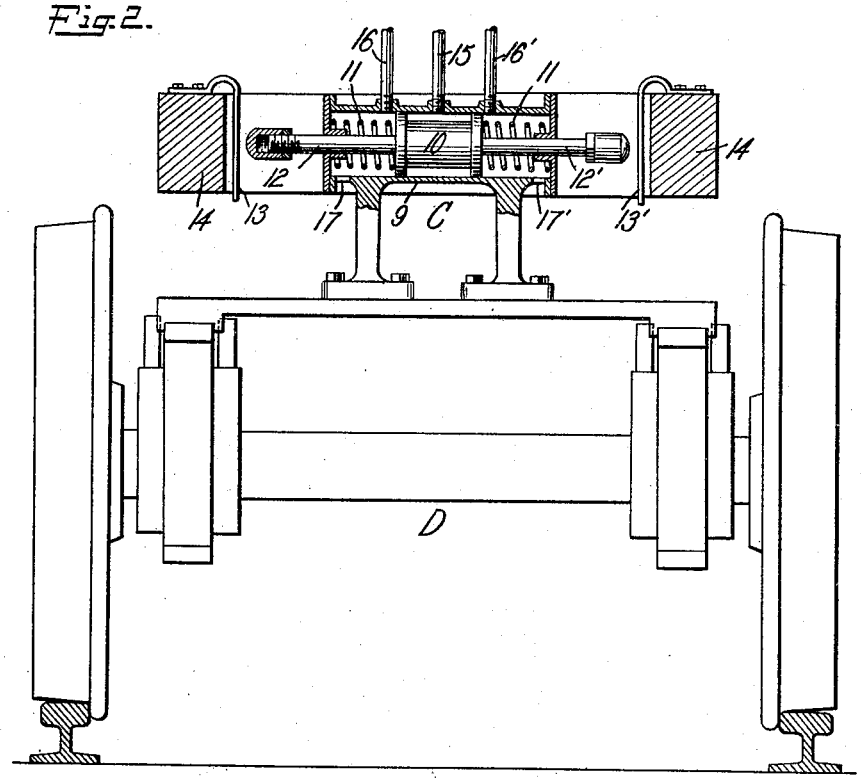
Figure 3:
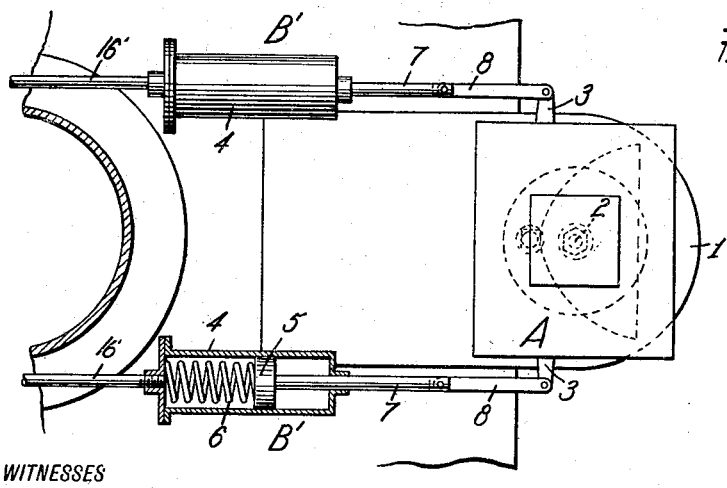

In the accompanying drawings, which illustrate one embodiment of the invention and wherein similar characters of reference indicate corresponding parts in all the views, Figure 1 is a side view of the front portion of a locomotive showing the dirigible headlight appliance mounted thereon; Fig. 2 is a section on the line 2—2, Fig. 1; and Fig. 3 is a plan view of the headlight and the motors for actuating the same.

Referring to the drawing, A designates a headlight which is mounted on a suitable bracket or support 1 by means of a pivot bolt 2 which has its axis vertical so that the headlight can, as a whole, be swung to the right or left on a vertical axis to cast the beam of light to one side or the other from a straight ahead line for the purpose of enabling the track at curves to be effectively illuminated. The casing of the headlight has laterally extending arms 3 which are connected with motors B and B' for respectively throwing the light rays to the right or left. In the present instance the motors are of the fluid-actuated type, but it is to be understood that they can be electrical devices. Each motor consists of a cylinder 4, a piston 5, a spring 6, a rod 7, and a connecting link 8. The motors are oppositely disposed and the springs 6 thereof are of equal tension so that normally the pistons 5 will occupy the same relative position for the purpose of maintaining the headlight central. When fluid is supplied to one cylinder or the other the piston therein is actuated so as to shift the headlight, and in so doing the spring in the other cylinder is compressed and placed under tension for the purpose of restoring the parts to normal position when the fluid pressure is removed from the active motor.

For controlling the motors B and B' a controller C is mounted on the front truck D of the locomotive, and in the present instance this controller consists of a cylinder 9, a piston valve 10 slidable therein, springs 11 acting on opposite ends of the piston to maintain the same central, buffer rods 12 and 12' connected with the piston and extending out of the ends of the cylinders, buffer plates 13 and 13' carried by the frame 14 of the locomotive, a supply pipe 15, motor feeding pipes 16 and 16', and exhaust ports 17 and 17'. When the piston valve 10 is in central position, as shown in Fig. 2, the pipe 15, which may be connected with the air brake reservoir is out of communication with the pipes 16 and 16', so that the headlight will be kept central, but when the locomotive turns there will be a relative shifting of the truck D, and the frame 14 of the locomotive, whereby the buffer plate 13 will engage the buffer 12 or the buffer plate 13' will engage the buffer 12', according to the direction in which the track curves, and as a result the piston valve 10 will be shifted to connect the pipes 15 and 16 or 15 and 16', allowing more or less air to flow to the motors B or B'. As soon as the locomotive reaches a straight portion of the track the active buffer plate disengages the associated buffer so that the valve piston can return to central position, whereby the supply of air from the pipe 15 is cut off and the motor B or B' will exhaust through a port 17 or 17' and consequently the headlight will be restored to normal position.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. The combination of a vehicle body, a truck pivotally connected therewith, with a dirigible headlight, a motor device for shifting the headlight, and a controller having a single movable element yieldingly held in a central position and movable to either side of such position, abutments to engage and move the element in one direction or the other, according to the relative changing of the body and truck, and means for supplying power to the motor device by the element when moved to either side of its central position.

2. The combination of a locomotive body and a truck pivotally connected therewith, with a dirigible headlight, a motor device for shifting the headlight, and a controller mounted on the truck at a point spaced from the pivotal connection of the latter with the body and having a movable element extending transversely to the body for engagement thereby as the body shifts to the right or left with respect to the truck, whereby the said element controls the motor device.

3. The combination of a locomotive body and a truck, with a dirigible headlight carried by the body, motors connected with the headlight for shifting the position thereof, and a controller for controlling the motors, said controller including a cylinder, a piston valve in the cylinder, spring means for holding the valve in normal position, means depending on the relative shifting of the truck and body for shifting the valve, a fluid supply pipe connected with the cylinder, and a device connecting the cylinder with the motors for supplying fluid thereto according to the position of the valve.

4. The combination of a locomotive body and a truck, with a dirigible headlight carried by the body, and means for controlling the headlight, said means consisting of a cylinder extending transversely to the body, a piston in the cylinder, buffer rods connected with the piston and extending out of the ends of the cylinder, yielding buffer plates normally spaced from the rods and adapted to engage the same for shifting the valve, yielding means for holding the valve in central position, a fluid supply pipe connected with the cylinder, fluid pipes connected with the cylinder and adapted to communicate with the first-mentioned pipe through the shifting of the valve, and means receiving fluid from the last-mentioned pipes for shifting the headlight.

In testimony whereof we have signed our names to this specification in the presence of two subscribing witnesses.

HARRY E. BEASLEY.
WALTER BYRD.

Witnesses:
J. J. CALKINS,
R. B. MOSHER.

Copies of this patent may be obtained for five cents each, by addressing the "Commissioner of Patents, Washington, D. C."